(12) United States Patent
Donchev (10) Patent No.: US 12,253,731 B2
(45) Date of Patent: Mar. 18, 2025

(54) RACK MOUNTABLE PANEL FOR OPTIMIZING SLACK STORAGE AND MANAGEMENT OF OPTICAL FIBER CABLES

(71) Applicant: OPTERNA AM, INC., East Syracuse, NY (US)

(72) Inventor: Stefan Donchev, Milton Keynes (GB)

(73) Assignee: OPTERNA AM, INC., East Syracuse, NY (US)

( * ) Notice: Subject to any disclaimer, the term of this patent is extended or adjusted under 35 U.S.C. 154(b) by 0 days.

(21) Appl. No.: 17/984,841

(22) Filed: Nov. 10, 2022

(65) Prior Publication Data

US 2023/0141550 A1    May 11, 2023

Related U.S. Application Data

(60) Provisional application No. 63/263,827, filed on Nov. 10, 2021.

(51) Int. Cl.
*G02B 6/44* (2006.01)
*G02B 6/36* (2006.01)

(52) U.S. Cl.
CPC ............ *G02B 6/444* (2013.01); *G02B 6/3616* (2013.01); *G02B 6/44526* (2023.05)

(58) Field of Classification Search
CPC ........................................... G02B 6/444–4458
See application file for complete search history.

(56) References Cited

U.S. PATENT DOCUMENTS 4,900,123 A * 2/1990 Barlow ................ G02B 6/4454
  385/53
5,013,121 A * 5/1991 Anton .................. G02B 6/4452
  385/135

(Continued)

FOREIGN PATENT DOCUMENTS

EP   2767856 B1 *  6/2016
EP   3650899 A1    5/2020

(Continued)

OTHER PUBLICATIONS

Commscope, FPX Series 1U & 2U Fiber Panel User Manual, ADCP-92-098 Rev. C, May 2018. retrieved via https://www.commscope.com/globalassets/digizuite/53381-adcp-92-098-5-17-18-pdf.pdf (Year: 2018).*

(Continued)

*Primary Examiner* — Michael Stahl
(74) *Attorney, Agent, or Firm* — MH2 TECHNOLOGY LAW GROUP LLP (57) ABSTRACT

A cable management panel for optimizing management and storage of a slack portion of a fiber optic cable includes a base portion and a cable support portion that is configured to extend from the base portion. The cable support includes a curved portion configured to prevent a fiber optic cable that is wrapped around the curved portion from being bent beyond a minimum bend radius. The cable support is configured to provide a path structure for optimizing management and storage of different lengths of slack of fiber optic cables such that a selected path length from an end of the base portion to the curved portion of the cable support and back to the end of the base portion substantially matches a length of slack of a fiber optic cable such that the length of slack is maintained within the height of the base so as to (Continued)

eliminate the need for slack cable management structures in space about a rack to which the panel is mounted.

28 Claims, 4 Drawing Sheets

(56) References Cited

U.S. PATENT DOCUMENTS

| | | | |
|---|---|---|---|
| 5,724,469 A * | 3/1998 | Orlando | G02B 6/444 385/135 |
| D404,010 S | 1/1999 | Viklund et al. | |
| 5,913,006 A * | 6/1999 | Summach | G02B 6/4471 385/134 |
| 6,061,492 A | 5/2000 | Strause et al. | |
| 6,263,141 B1 | 7/2001 | Smith | |
| 6,289,159 B1 | 9/2001 | Van Hees et al. | |
| 6,301,424 B1 | 10/2001 | Hwang | |
| 6,365,834 B1 | 4/2002 | Larsen et al. | |
| 6,810,193 B1 * | 10/2004 | Muller | G02B 6/4454 385/134 |
| 7,142,764 B2 * | 11/2006 | Allen | G02B 6/4454 385/134 |
| 8,208,781 B1 * | 6/2012 | Morgan | G02B 6/4455 385/139 |
| 2006/0215980 A1 * | 9/2006 | Bayazit | G02B 6/4454 385/135 |
| 2007/0212010 A1 * | 9/2007 | Caveney | G02B 6/4452 385/135 |
| 2008/0023212 A1 | 1/2008 | Larsen et al. | |
| 2010/0158466 A1 * | 6/2010 | Cassidy | G02B 6/4455 385/135 |
| 2011/0274402 A1 | 11/2011 | Giraud et al. | |
| 2011/0317971 A1 * | 12/2011 | Zhang | H04Q 1/06 385/135 |
| 2014/0367163 A1 * | 12/2014 | Islam | G02B 6/4446 242/601 |
| 2021/0096316 A1 | 4/2021 | Geens et al. | |

FOREIGN PATENT DOCUMENTS

| | | |
|---|---|---|
| JP | 2000-241629 A * | 9/2000 |
| WO | 9730370 A1 | 8/1997 |
| WO | 2020043919 A1 | 3/2020 |
| WO | 2021180796 A1 | 9/2021 |

OTHER PUBLICATIONS

Panduit, PanZone® Horizontal Slack Manager and Accessories Specification Sheet, Jul. 2017. retrieved via https://www.panduit.com/content/dam/panduit/en/products/media/2/82/482/6482/101006482.pdf (Year: 2017).*

RLH Industries, Inc., Optimum Series 2RU Patch Panel User Guide, Mar. 2018. retrieved via https://www.fiberopticlink.com/wp-content/downloads/_pdf/products/Optimum2RU_Patch_Panel_U-061-web.pdf (Year: 2018).*

International Search Report and Written Opinion dated Mar. 20, 2023 in corresponding International Application No. PCT/US2022/049577, 18 pages.

* cited by examiner

RACK MOUNTABLE PANEL FOR OPTIMIZING SLACK STORAGE AND MANAGEMENT OF OPTICAL FIBER CABLES

CROSS-REFERENCE TO RELATED APPLICATION

This application claims the benefit of U.S. Provisional Application No. 63/263,827, filed Nov. 10, 2021, the disclosure of which is hereby incorporated by reference herein in its entirety.

TECHNICAL FIELD

The present disclosure generally relates to an optical fiber communication system and, more particularly, to a rack mountable panel for optimizing slack storage and management of optical fiber cables in an optical fiber communication system.

BACKGROUND

Conventional optical fiber distribution systems may include a rack or frame having several bays for receiving connector modules, associated jumper organizers for storing extra lengths of cables (which may also be called pigtails or patch cords and comprise connectorized optical fibers which are connected to the connector modules), and upper and lower troughs for conveying jumper fibers between adjacent bays. Extra lengths of cables are typically stored in vertical passageways or raceways around the rack and outside of the bays to which the connector modules are mounted. The vertical raceways typically contain several structures, for example, spools, for managing slack cables.

However, such storage systems provide poor organization of the spare jumper lengths, and tangling of cables is therefore possible, and even likely. This tangling leads to the disturbance of other cables when attempting to access one particular jumper, which can cause losses in optical signal transmission. Furthermore, the tangling of cables is exacerbated by the fact that the vertical raceways (where the spare jumper lengths are stored) are also used to route cables between the bays of the distribution system, and so these raceways are normally very crowded with cables. This also makes the provision of wide vertical raceways between the bays a necessity, which is disadvantageous in situations where there is insufficient space available for such wide vertical raceways.

It may be desirable to provide a cable management panel for optimizing slack storage and management of optical fiber cables in an optical fiber communication system so as to eliminate the need for slack cable management structures in space about a rack to which the panel is mounted. It may be desirable to provide such a cable management panel that is mountable in a standard rack mount system. It may be desirable to provide such a cable management panel in a 2 rack unit (2U) configuration.

SUMMARY

According to various aspects of the disclosure, a cable management panel for optimizing management and storage of a slack portion of a fiber optic cable includes a base that is configured to include a planar portion having a first end and a second end in a longitudinal direction and a curved portion extending from the first end of the planar portion, a cable support that is configured to extend substantially perpendicularly from the planar portion of the base, a cable management structure that is disposed proximate the first end of the planar portion and configured to extend substantially perpendicularly from the planar portion of the base in a same direction as the cable support, and a cable retaining structure that is disposed along a longitudinal edge of the planar portion and configured to extend substantially perpendicularly from the planar portion of the base in the same direction as the cable support. The base has a height equal to two rack units, and the base is configured to be mounted in a rack having a standard rack length. The cable retaining structure is configured to retain a slack fiber optic cable between the longitudinal edge and an opposed longitudinal edge of the base, the curved portion of the base is configured to prevent a fiber optic cable that is wrapped around the curved portion of the base from being bent beyond a minimum bend radius, and the cable support includes a curved portion configured to prevent a fiber optic cable that is wrapped around the curved portion from being bent beyond a minimum bend radius. The cable support is configured to provide a path structure for optimizing management and storage of different lengths of slack of fiber optic cables such that a selected path length from the cable management structure to the curved portion of the cable support and back to the cable management structure substantially matches a length of slack of a fiber optic cable and such that the length of slack is maintained within the height of the base so as to eliminate the need for slack cable management structures in space about a rack to which the panel is mounted.

According to various aspects of the above embodiment, the standard rack length of the base is 19" or 23".

According to various aspects of any of the above embodiments, the cable support comprises a plurality of cable supports spaced apart along a length of the base.

According to various aspects of any of the above embodiments, each of the plurality of cable supports is configured to provide a different path length from the cable management structure to the curved portion of the cable support and back to the cable management structure so as to provide different path lengths that are configured to provide optimized management and storage of different lengths of slack of fiber optic cables According to various aspects of any of the above embodiments, each of the cable supports comprises a D shape, and the curved portions of the cable supports face a same direction.

According to various aspects of any of the above embodiments, the panel further includes a second cable support comprising a D shape that is backward relative to the cable supports, and wherein the second cable support is disposed at the first end of the planar portion of the base between the cable management structure and one of the cable supports that is closest to the cable management structure.

According to various aspects of any of the above embodiments, the cable management structure comprises a clip configured to receive a fiber optic cable. In some aspects, the clip comprises two clips.

In accordance with various embodiments of the disclosure, a cable management panel for optimizing management and storage of a slack portion of a fiber optic cable includes a base that is configured to include a planar portion, a cable support that is configured to extend from the planar portion of the base, and a cable management structure that is disposed proximate an end of the planar portion and configured to extend from the planar portion of the base in a same direction as the cable support. The cable support includes a curved portion configured to prevent a fiber optic cable that is wrapped around the curved portion from being bent beyond a minimum bend radius. The cable support is configured to provide a path structure for optimizing management and storage of different lengths of slack of fiber optic cables such that a selected path length from the cable management structure to the curved portion of the cable support and back to the cable management structure substantially matches a length of slack of a fiber optic cable so as to eliminate the need for slack cable management structures in space about a rack to which the panel is mounted.

According to various aspects of any of the above embodiments, the panel further comprises a cable retaining structure that is disposed along a length of the planar portion in a longitudinal direction of the base and configured to extend from the planar portion of the base in the same direction as the cable support, and wherein the cable retaining structure is configured to retain a slack fiber optic cable between the longitudinal edges of the base.

According to various aspects of any of the above embodiments, the base has a height equal to two rack units.

According to various aspects of any of the above embodiments, the base is configured to be mounted in a rack having a standard rack length of 19" or 23".

According to various aspects of any of the above embodiments, the cable support comprises a plurality of cable supports spaced apart along a length of the base.

According to various aspects of any of the above embodiments, each of the plurality of cable supports is configured to provide a different path length from the cable management structure to the curved portion of the cable support and back to the cable management structure so as to provide different path lengths that are configured to provide optimized management and storage of different lengths of slack of fiber optic cables.

According to various aspects of any of the above embodiments, each of the cable supports comprises a D shape, and the curved portions of the cable supports face a same direction.

According to various aspects of any of the above embodiments, the panel further comprises a second cable support comprising a D shape that is backward relative to the cable supports, and wherein the second cable support is disposed at the first end of the planar portion of the base between the cable management structure and one of the cable supports that is closest to the cable management structure.

According to various aspects of any of the above embodiments, the cable management structure comprises a clip configured to receive a fiber optic cable. In some aspects, the clip comprises two clips.

In accordance with various embodiments of the disclosure, a cable management panel for optimizing management and storage of a slack portion of a fiber optic cable includes a base portion and a cable support portion that is configured to extend from the base portion. The cable support includes a curved portion configured to prevent a fiber optic cable that is wrapped around the curved portion from being bent beyond a minimum bend radius. The cable support is configured to provide a path structure for optimizing management and storage of different lengths of slack of fiber optic cables such that a selected path length from an end of the base portion to the curved portion of the cable support and back to the end of the base portion substantially matches a length of slack of a fiber optic cable so as to eliminate the need for slack cable management structures in space about a rack to which the panel is mounted.

According to various aspects of any of the above embodiments, the panel further comprises a cable retaining structure that is disposed along a length of the base portion and configured to extend from the base portion in the same direction as the cable support, and wherein the cable retaining structure is configured to retain a slack fiber optic cable between longitudinal edges of the base portion.

According to various aspects of any of the above embodiments, the base portion has a height equal to two rack units.

According to various aspects of any of the above embodiments, the base portion is configured to be mounted in a rack having a standard rack length of 19" or 23".

According to various aspects of any of the above embodiments, the cable support comprises a plurality of cable supports spaced apart along a length of the base portion.

According to various aspects of any of the above embodiments, each of the plurality of cable supports is configured to provide a different path length from the end of the base portion to the curved portion of the respective cable support and back to the end of the base portion so as to provide different path lengths that are configured to provide optimized management and storage of different lengths of slack of fiber optic cables.

According to various aspects of any of the above embodiments, each of the cable supports comprises a D shape, and the curved portions of the cable supports face a same direction.

According to various aspects of any of the above embodiments, the panel further comprises a second cable support comprising a D shape that is backward relative to the cable supports, and wherein the second cable support is disposed between the end of the base portion and one of the cable supports that is closest to the end of the base portion.

According to various aspects of any of the above embodiments, the panel further comprises a cable management structure that is disposed proximate the end of the base portion and configured to extend from the base portion in a same direction as the cable support.

According to various aspects of any of the above embodiments, the cable management structure comprises a clip configured to receive a fiber optic cable. In some aspects, the clip comprises two clips.

BRIEF DESCRIPTION OF THE DRAWINGS

Further advantages and features of the present disclosure will become apparent from the following description and the accompanying drawings, to which reference is made. In which are shown.

DETAILED DESCRIPTION

Reference will now be made in detail to presently preferred embodiments and methods of the present disclosure, which constitute the best modes of practicing the present disclosure presently known to the inventors. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way. It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
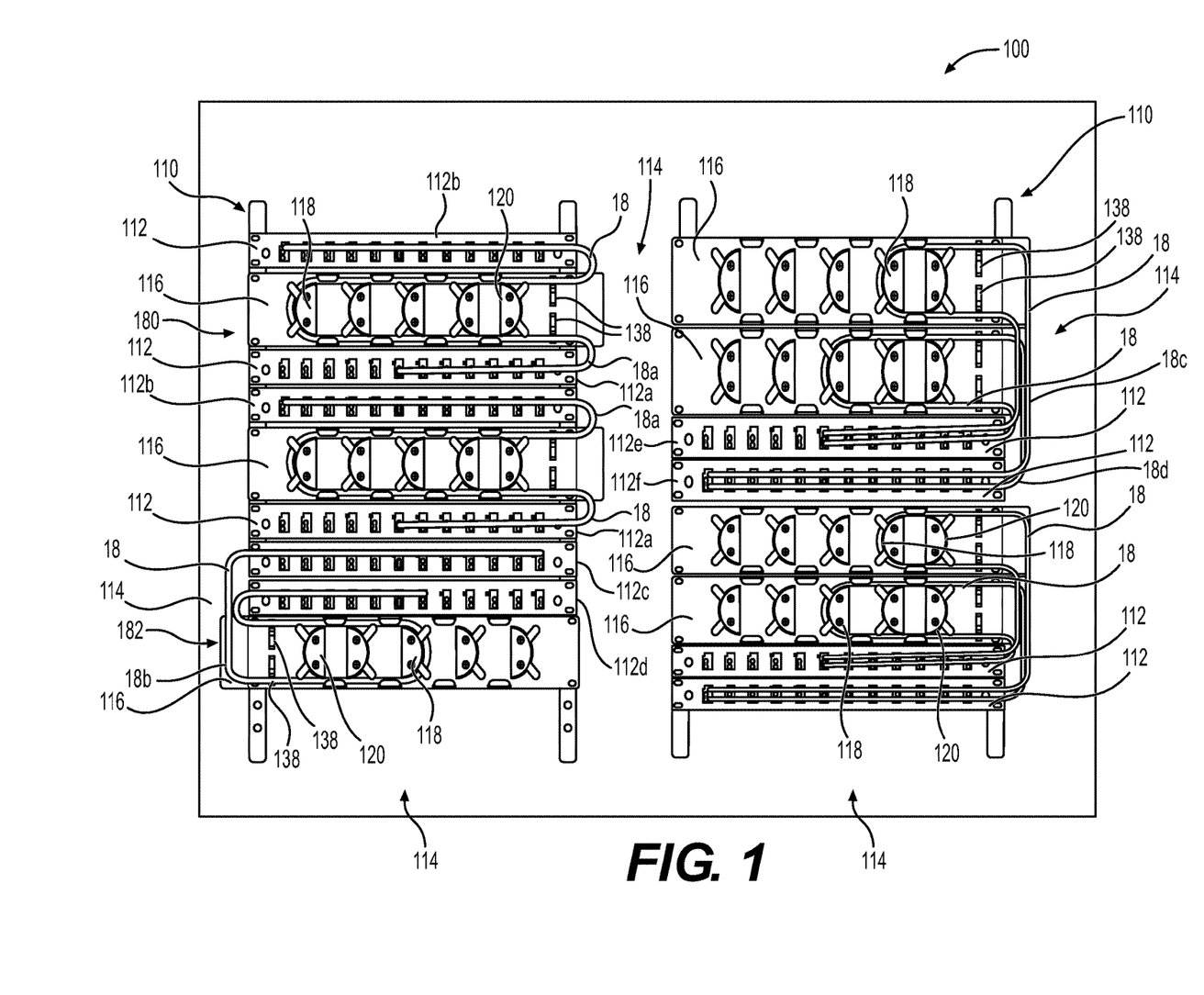
FIG. 1 illustrates an exemplary optical fiber communication system including an exemplary cable management panel according to various aspects the present disclosure.

FIG. 1 illustrates an exemplary optical fiber communication system 100. The system includes one or more racks 110 of optical fiber connectivity modules 112 and passageways, raceways, or ducting 114 around the racks 110 through which cables, for example, optical fiber cables, may be routed. Depending on the size of the enclosure containing the rack(s) 110 and/or the amount of space available around the rack(s) 110, for example, above, below, left, and right of the rack(s) 110, conventional slack fiber cable management structures, such as spools, may not be usable in such space around the rack(s) 110.

As illustrated in FIG. 1, a cable management panel 116 in accordance with the present disclosure is configured to be mounted to a rack 110, for example, in an active street cabinet or an equipment rack with low to medium fiber density. The cable management panel 116 may be configured as a 2 rack unit (or 2U) panel, for example, a panel having a 2U height and a standard rack mountable length, for example, 19" or 23", where one rack unit is equal to 1.75 inches. In some aspects, the space available around the rack 110 for fiber cable slack management may be insufficient for conventional slack fiber cable management structures, such as spools.

The panel 116 is configured to store and/or manage slack cable (or a slack portion of cable), for example, fiber optic cables such as patch cables, pigtails, and the like. The fiber optic cables may be preconnectorized and/or ruggedized, as would be understood by persons skilled in the art.

Figure 2:
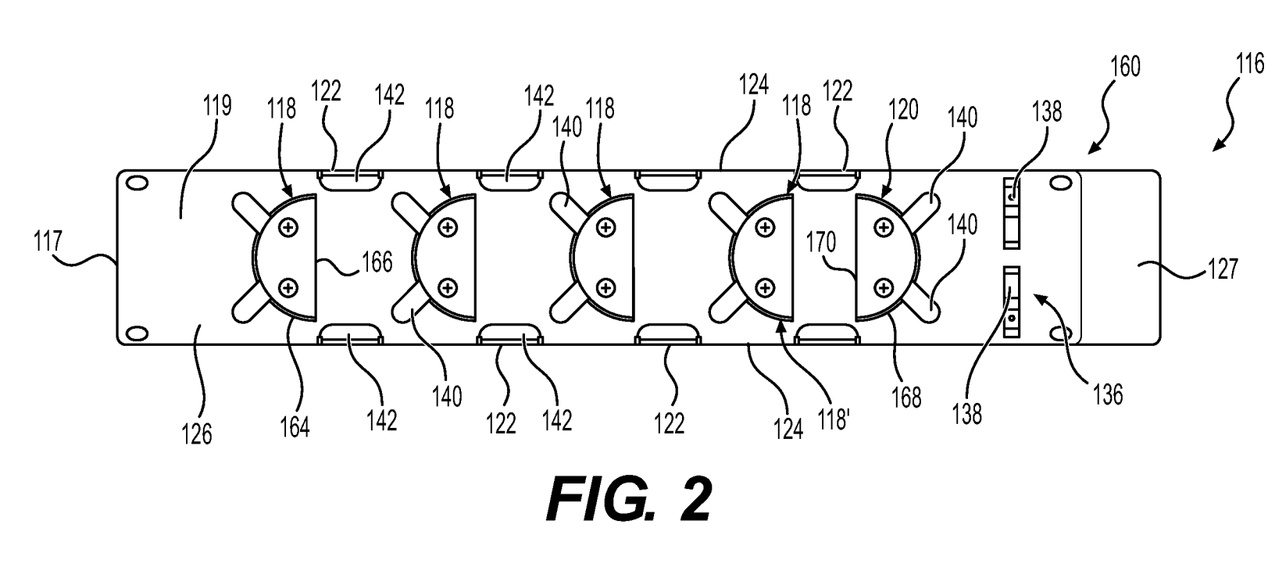
FIG. 2 is a front view of an exemplary cable management panel according to various aspects the present disclosure.
Figure 3:
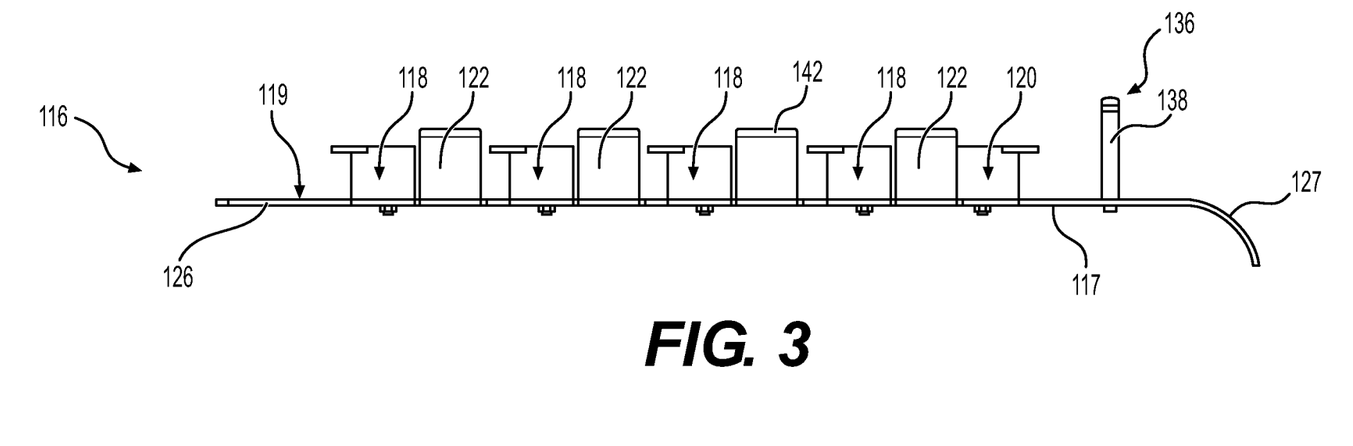
FIG. 3 is a bottom view of the cable management panel of FIG. 2.
Figure 4:
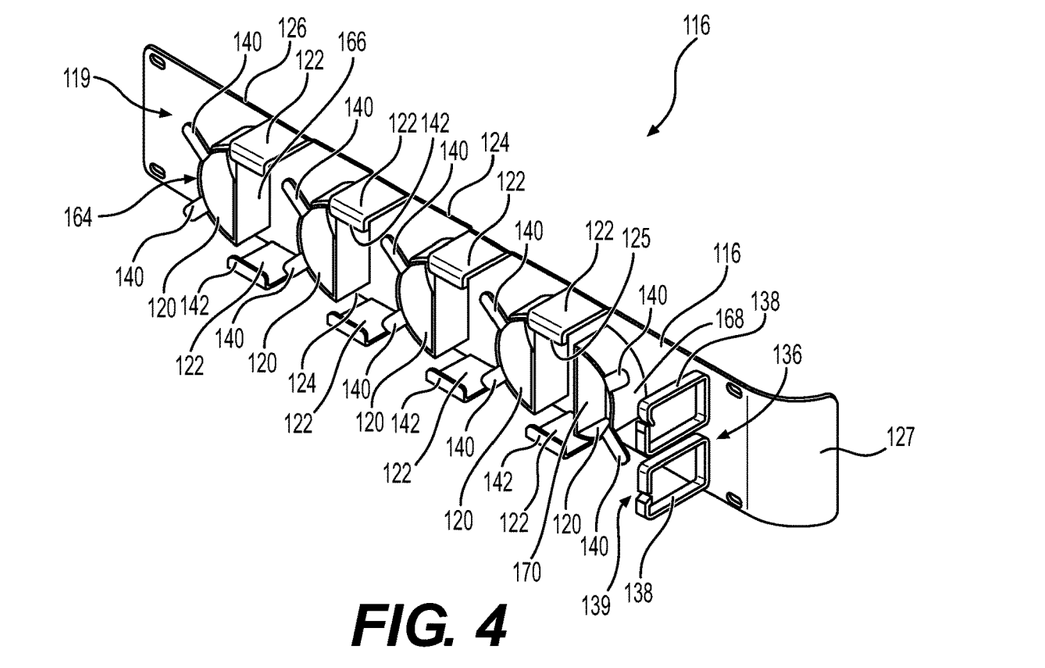
FIG. 4 is a perspective view of the cable management panel of FIG. 2.

Referring now to FIGS. 2-4, the cable management panel 116 may include a base or base portion 117, a first cable support or first cable support portion 118, and a second cable support or second cable support portion 120. In the illustrated embodiment, the cable management panel 116 includes four first cable supports 118 and one second cable support 120. Of course, it should be understood that the panel 116 may include more or less than four first cable supports 118 and/or more than one second cable support 120. The base 117 may include a planar portion 126 and a curved portion 127 at a first end 160 of the planar portion 126. The planar portion 126 may be sized and arranged with a radius of curvature configured such that an optical fiber cable being wrapped around the curved portion 127 is prevented from being bent beyond a normal operation minimum bend radius. As would be appreciated by persons skilled in the art, if an optical fiber cable 18 is bent beyond the minimum bend radius, signal degradation, signal loss, and/or a broken fiber may result.

The first cable supports 118 and the second cable support 120 may extend substantially perpendicularly from a first side 119 of the base 117, for example, the planar portion 126 of the base 117, as best shown in FIG. 3. The first cable supports 118 are spaced apart sequentially along a longitudinal direction of the base 117 from a second end 162 of the planar portion 126 toward the first end 160. The second cable support 120 is spaced from the first cable support 118' that is nearest the first end 160 and is between the first cable support 118' and the curved portion 127.

As illustrated in FIG. 2, the first cable supports 118 are configured in a backward D shape when the panel 116 is viewed with the curved portion 127 to the right of the planar portion 126. The second cable support 118 is configured in a D shape when the panel 116 is viewed with the curved portion 127 to the right of the planar portion 126. For example, the first cable supports 118 include a curved portion 164 and a planar portion 166 that form the D shape, and the second cable support 120 includes a curved portion 168 and a planar portion 170 that form the D shape. The curved portions 164, 168 are sized and arranged with a radius of curvature configured such that an optical fiber cable 18 being wrapped around any of the curved portions 164, 168 is prevented from being bent beyond a normal operation minimum bend radius. As would be appreciated by persons skilled in the art, if an optical fiber cable 18 is bent beyond the minimum bend radius, signal degradation, signal loss, and/or a broken fiber may result.

The first and second cable supports 118, 120 may include a retaining feature 140 at their end surfaces furthest from the first side 119 of the base 117. The retaining feature 140 may comprise a tab extending outward from the first and/or second cable supports 118, 120, for example, the curved portions 164, 168, and substantially parallel to the planar portion 170 of the base 117 such that the retaining feature 140 is configured to retain a fiber optic cable between the retaining feature 140 and the first side 119 of the base 117. In some embodiments, the retaining features 140 may include more than one tab extending from the curved portion 164 or 168.

As shown, the planar portion 170 of the second cable support 120 faces in a direction toward the first cable supports 118, and the curved portion 168 of the second cable support 120 faces in a direction away from the first cable supports 118. Similarly, the planar portions 166 of the first cable supports 118 face in a direction toward the second cable support 120, and the curved portions 164 of the first cable supports 118 face in a direction away from the second cable support 120. The first cable supports 118 and the second cable support 120 are configured to provide multiple path lengths for managing and/or storing various slack lengths of optical fiber cable 18, as will be described in more detail below.

Figure 5:
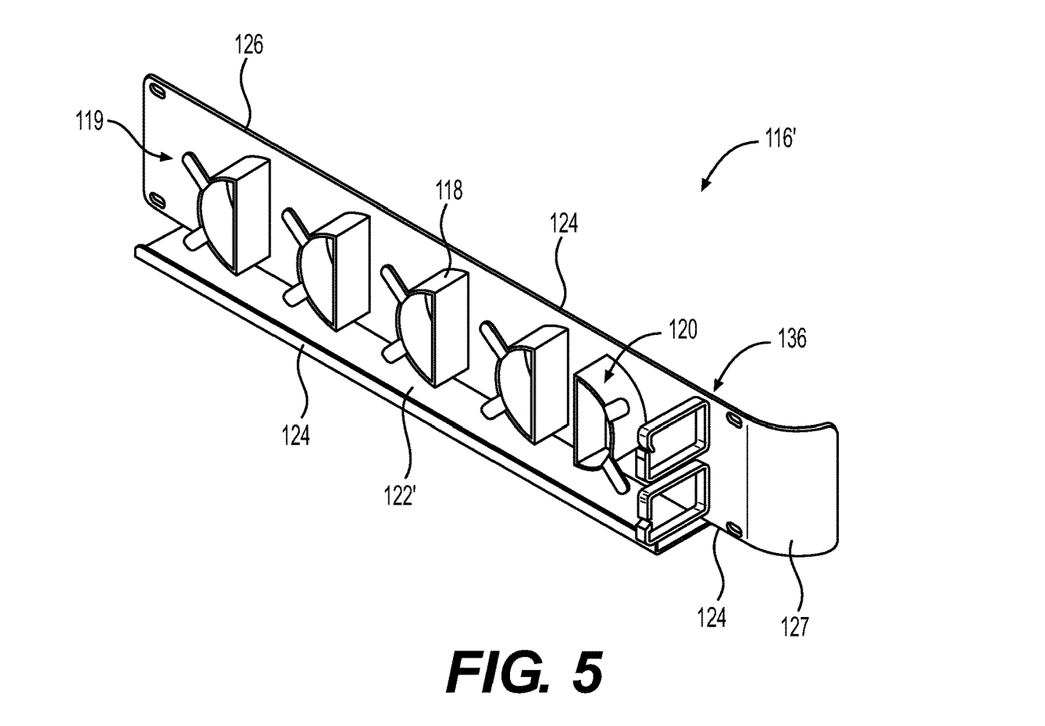
FIG. 5 is a perspective view of another exemplary cable management panel according to various aspects the present disclosure.

The panel 116 may include a retaining structure 122, 142 along a longitudinal edge 124 of the panel 116, for example, the planar portion 126 of the panel 116. The retaining structure 122, 142 is configured to retain a portion of the slack length of optical fiber cable 118 in the 2U height of the panel 116 for management and storage. In some embodiments, the retaining structure 122, 142 may comprise a substantially planar tab extending substantially perpendicularly from the first side 119 of the base 117, for example, the planar portion 126 of the base 117, in the same direction as the first and second cable supports 118, 120. The free end of the retaining structure 122, 142 may comprise a lip 125 facing inward relative to the longitudinal edge 124. The retaining structure 122, 142 may comprise a plurality of spaced apart retaining structures 122, 142, as illustrated in FIGS. 2-4, or a single elongated retaining structure 122', as shown in FIG. 5. In some embodiments, the panel 116 may include a retaining structure 122, 142 along both longitudinal edges 124, as shown in FIGS. 2-4, while is other embodiments, a panel 116' may include a retaining structure 122, 142 along only one of the longitudinal edges 124, as shown in FIG. 5.

The panel 116 may include a cable management structure 136 at the first side 119 of the base 117, for example, the planar portion 126 of the base 117 between the second cable support 120 and the first end 160 of the planar portion 126. In some embodiments, the cable management structure 136 may comprise a clip or bracket 138 extending substantially perpendicularly from the first side 119 of the base 117, for example, the planar portion 126 of the base 117, in the same direction as the first and second cable supports 118, 120 and the retaining structure 122, 142. The clip 138 may include an opening configured to receive a fiber optic cable and, in some embodiments, the clip 138 may be configured such that the opening is closable. In some embodiments, the cable management structure 136 may include two clips 138 that are spaced apart from one another in a direction from one of the longitudinal edges 124 to the other, as best illustrated in FIG. 2. The cable management structure 136 may be configured such a first portion of a fiber optic cable 18 can pass through one clip 138, a second portion can wrap around a first cable support 118, and a third portion can pass through the other clip, as will be described in more detail below.

In use, as illustrated in FIG. 1, the panel 116 is configured to be mounted horizontally in a rack 110 of an optical fiber communication system 100. The panel 116 may be mounted in a first horizontal orientation 180 where the second cable support 120 and the first end 160 of the planar portion 126 are at the right side of the rack 110 or in a second horizontal orientation 182 where the second cable support 120 and the first end 160 of the planar portion 126 are at the left side of the rack 110.

As shown in FIG. 1, the panel 116 is configured to manage various different lengths of slack cable from various different lengths of preconnectorized fiber optic cables 18, for example, patch cables or pigtails. For example, two fiber optic cables 18a having the same length are received by panels 116 in the first horizontal orientation 180. The fiber optic cables 18a are fed from a first connectivity module 112a through a first clip 138 of the cable management structure 136, wrapped around the left-most one of the first cable supports 118, and fed back through a second clip 138 of the cable management structure 136 to a second connectivity module 112b.

Another fiber optic cable 18b having a length that is shorter than that of the fiber optic cable 18a similarly is fed from a first connectivity module 112c through a first clip 138 of the cable management structure 136, is wrapped around the third from the right of the first cable supports 118, and is then fed back through a second clip 138 of the cable management structure 136 to a second connectivity module 112d.

In another arrangement, two fiber optic cables 18a having different lengths are received by panels 116 in the first horizontal orientation 180. A fiber optic cable 18c having a first length of slack cable is fed from a first connectivity module 112e through a first clip 138 of the cable management structure 136, wrapped around the right-most one of the first cable supports 118, and fed back through a second clip 138 of the cable management structure 136 to a second connectivity module 112f. Another fiber optic cable 18d having a length of slack cable that is longer than that of the fiber optic cable 18c similarly is fed from the first connectivity module 112e through a first clip 138 of the cable management structure 136, is wrapped around the second from the right of the first cable supports 118, and is then fed back through a second clip 138 of the cable management structure 136 to the second connectivity module 112f.

As illustrated, the cables 18a, 18b, 18c, 18d are selectively wrapped around the one of the first cable supports 118 such that management and storage of the slack of the cables 18a, 18b, 18c, 18d is optimized; that is, a path length from the cable management structure 136 to the curved portion 164 of the selected one of the first cable supports 118 (such that the slack can be wrapped around the curved portion 164) and back to the cable management structure 136 substantially matches a length of the slack of the cable 18a, 18b, 18c, 18d. In such an optimized management and storage arrangement, the slack of the cables 18a, 18b, 18c may have a minimized amount of droop such that the slack remains between the longitudinal edges 124 of the base 117. In some aspects, the retaining structure 122, 142 may assist with maintaining the slack of the cables 18a between the longitudinal edges 124.

In some aspects, the management and storage of the slack of the cables 18a, 18b, 18c, 18d is optimized when the slack of the cables 18a, 18b, 18c, 18d takes the shortest path from the cable management structure 136 to being wrapped around a curved portion 164 of a first cable support 118 and back to the cable management structure 136 so as to eliminate the need for slack cable management structures in space about a rack to which the panel is mounted. In some aspects, the management and storage of the slack of the cables 18a, 18b, 18c is optimized when the slack of the cables 18a, 18b, 18c has the least amount of droop as the slack extends from the cable management structure 136 to being wrapped around a first cable support 118 (and optionally the second cable support) and back to the cable management structure 136 so as to eliminate the need for slack cable management structures in space about a rack to which the panel is mounted.

Although not illustrated, it should be appreciated that a panel 116 can receive a plurality of slack lengths of fiber optic cables 18, and the fiber optic cables may have the same or different lengths and/or the slack portions of the fiber optic cables may have the same or different lengths. Further, it should be understood that a slack portion of a fiber optic cable may be sufficiently long such that when the cable is fed through the cable management structure 136 and wrapped around a furthest one of the first supports 118, a remaining length of the slack portion may still need to be managed before the cable is fed back through the cable management structure 136. In such a situation, the remaining length of the slack portion may be wrapped around the second support 120 and then wrapped around one of the first supports 118 before being fed through the cable management structure 136.

In the above embodiments, the panel 116 is configured to optimize management and storage of the slack of a fiber optic cable by providing a path length from the cable management structure 136 to the curved portion 164 of a first cable support 118 (such that the slack can be wrapped around the curved portion 164) and back to the cable management structure 136 that substantially matches a length of the slack of the cable 18 so as to eliminate the need for slack cable management structures in space about a rack to which the panel is mounted.

As described, the panel 116 may be reversibly mounted to a rack 110 such that the cable management structure 136 may be at the right side or the left side of the rack 110, thereby permitting fibers to be routed to the panel 116 from the right side or the left side of the rack 110.

Figure 6:
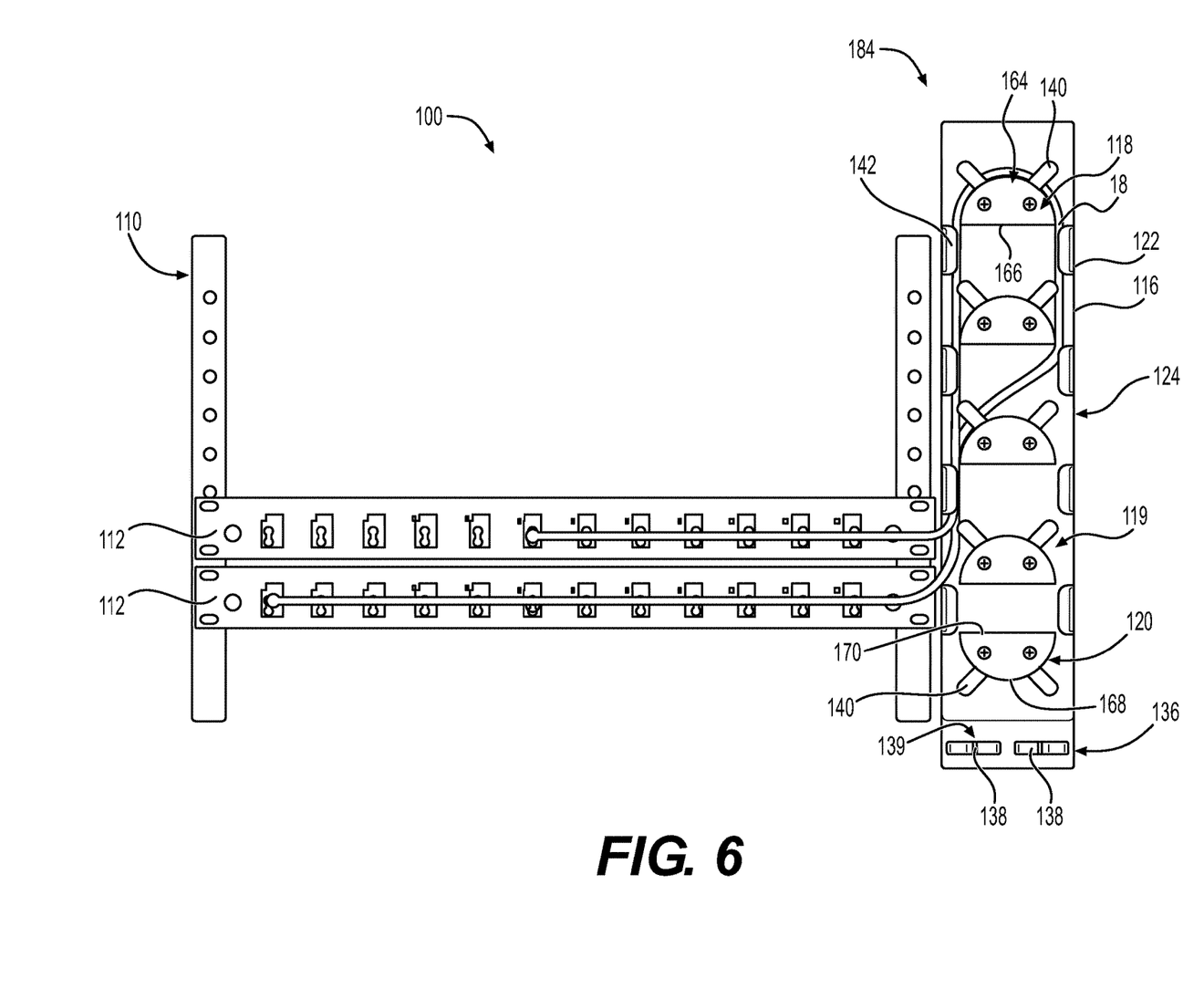
FIG. 6 illustrates the exemplary cable management panel of FIG. 2 disposed in an optical fiber communication system in a lateral configuration.

Referring now to FIG. 6, the panel 116 may also be arranged in a vertical orientation 184 to provide management and/or storage of a cable 18 laterally of the rack 110. As a result, the rack 110 includes more space for mounting connectivity modules 112. In the vertical orientation, the panel 116 permits various entry points for the cable, and the first and second supports 118, 120 permit various lengths of slack cable to be wrapped around the curved portion 164, 168 of a first cable support 118 and/or second cable support 120.

It should be appreciated that in some aspects, the panel 116 may be a single, monolithic piece of unitary construction such that the base 117, the first supports 118, the second supports 120, the retaining structure 122, 142, and the cable management structure 136 comprise a single, monolithic piece of unitary construction. In some aspects, the base 117, the first supports 118, the second supports 120, the retaining structure 122, 142, and/or the cable management structure 136 may be constructed as separate elements and assembled into an integral structure via any conventional attachment means, for example, a screw, a snap connection, or the like.

It should be appreciated that the first and second support elements 118, 120 may be hollow structures, as shown, or may be solid structures in other non-illustrated embodiments. In some aspects, the planar portions 166, 170 may be omitted such that the first and second support elements 118, 120 include only the curved portions 164, 168.

While at least one example, non-limiting embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cable management panel for optimizing management and storage of a slack portion of a fiber optic cable, comprising:
   a base that is configured to include a planar portion having a first end and a second end in a longitudinal direction and a curved portion extending from the first end of the planar portion;
   a cable support that is configured to extend substantially perpendicularly from the planar portion of the base;
   a cable management structure that is disposed proximate the first end of the planar portion and configured to extend substantially perpendicularly from the planar portion of the base in a same direction as the cable support;
   a cable retaining structure that is disposed along a longitudinal edge of the planar portion and configured to extend substantially perpendicularly from the planar portion of the base in the same direction as the cable support;
   wherein the base has a height equal to two rack units;
   wherein the base is configured to be mounted in a rack having a standard rack length;
   wherein the cable retaining structure is configured to retain a slack fiber optic cable between the longitudinal edge and an opposed longitudinal edge of the base;
   wherein the curved portion of the base is configured to prevent a fiber optic cable that is wrapped around the curved portion of the base from being bent beyond a minimum bend radius;
   wherein the cable support includes a curved portion configured to prevent a fiber optic cable that is wrapped around the curved portion from being bent beyond a minimum bend radius;
   wherein the cable support is configured to provide a path structure for optimizing management and storage of different lengths of slack of fiber optic cables such that a selected path length from the cable management structure to the curved portion of the cable support and back to the cable management structure substantially matches a length of slack of a fiber optic cable such that the length of slack is maintained within the height of the base so as to eliminate the need for slack cable management structures in space about a rack to which the panel is mounted;
   wherein the cable support comprises a plurality of cable supports spaced apart along a length of the base; and
   wherein each of the cable supports comprises a D shape, and the curved portion of each of the cable supports faces a same direction.

2. The panel of claim 1, wherein the standard rack length of the base is 19" or 23".

3. The panel of claim 1, wherein each of the plurality of cable supports is configured to provide a different path length from the cable management structure to the curved portion of the cable support and back to the cable management structure so as to provide different path lengths that are configured to provide optimized management and storage of different lengths of slack of fiber optic cables.

4. The panel of claim 1, further comprising a second cable support comprising a D shape that is backward relative to the cable supports, and wherein the second cable support is disposed at the first end of the planar portion of the base between the cable management structure and one of the cable supports that is closest to the cable management structure.

5. The panel of claim 1, wherein the cable management structure comprises a clip configured to receive a fiber optic cable.

6. The panel of claim 5, wherein the clip comprises two clips.

7. A cable management panel for optimizing management and storage of a slack portion of a fiber optic cable, comprising:
   a base that is configured to include a planar portion;
   a cable support that is configured to extend from the planar portion of the base;
   a cable management structure that is disposed proximate an end of the planar portion and configured to extend from the planar portion of the base in a same direction as the cable support;

wherein the cable support includes a curved portion configured to prevent a fiber optic cable that is wrapped around the curved portion from being bent beyond a minimum bend radius;

wherein the cable support is configured to provide a path structure for optimizing management and storage of different lengths of slack of fiber optic cables such that a selected path length from the cable management structure to the curved portion of the cable support and back to the cable management structure substantially matches a length of slack of a fiber optic cable such that the length of slack is maintained within the height of the base so as to eliminate the need for slack cable management structures in space about a rack to which the panel is mounted;

wherein the cable support comprises a plurality of cable supports spaced apart along a length of the base; and wherein each of the cable supports comprises a D shape, and the curved portion of each of the cable supports faces a same direction.

8. The panel of claim 7, further comprising a cable retaining structure that is disposed along a length of the planar portion in a longitudinal direction of the base and configured to extend from the planar portion of the base in the same direction as the cable support, and wherein the cable retaining structure is configured to retain a slack fiber optic cable between longitudinal edges of the base.

9. The panel of claim 7, wherein the base has a height equal to two rack units.

10. The panel of claim 7, wherein the base is configured to be mounted in a rack having a standard rack length of 19" or 23".

11. The panel of claim 7, wherein each of the plurality of cable supports is configured to provide a different path length from the cable management structure to the curved portion of the cable support and back to the cable management structure so as to provide different path lengths that are configured to provide optimized management and storage of different lengths of slack of fiber optic cables.

12. The panel of claim 7, further comprising a second cable support comprising a D shape that is backward relative to the cable supports, and wherein the second cable support is disposed at a first end of the planar portion of the base between the cable management structure and one of the cable supports that is closest to the cable management structure.

13. The panel of claim 7, wherein the cable management structure comprises a clip configured to receive a fiber optic cable.

14. The panel of claim 13, wherein the clip comprises two clips.

15. The panel of claim 7, wherein the cable management structure comprises a bracket configured to receive a fiber optic cable.

16. The panel of claim 1, wherein the cable management structure comprises a bracket configured to receive a fiber optic cable.

17. A cable management panel for optimizing management and storage of a slack portion of a fiber optic cable, comprising:
- a base portion having a planar portion extending in a longitudinal direction and a curved portion extending from an end of the planar portion;
- a support portion configured to extend from the planar portion and support a cable;
- wherein the base portion has a height equal to two rack units;
- wherein the curved portion is configured to curve about an axis that extends perpendicular to the longitudinal direction;
- wherein the curved portion is configured to prevent a fiber optic cable that is wrapped around the curved portion from being bent beyond a minimum bend radius;
- wherein the support portion includes a curved portion that is configured to prevent a fiber optic cable that is wrapped around the curved portion from being bent beyond a minimum bend radius; and
- wherein the support portion is configured to provide a path structure for optimizing management and storage of different lengths of slack of fiber optic cables such that a selected path length from an end of the base portion to the curved portion of the support portion and back to the end of the base portion substantially matches a length of slack of a fiber optic cable such that the length of slack is maintained within the height of the base so as to eliminate the need for slack cable management structures in space about a rack to which the panel is mounted.

18. The panel of claim 17, further comprising a cable retaining portion disposed along a length of the base portion and configured to extend from the base portion in the same direction as the support portion, and wherein the cable retaining portion is configured to retain a slack fiber optic cable between longitudinal edges of the base portion.

19. The panel of claim 17, wherein the base portion is configured to be mounted in a rack having a standard rack length of 19" or 23".

20. The panel of claim 17, wherein the support portion comprises a plurality of cable supports spaced apart along a length of the base portion.

21. The panel of claim 20, wherein each of the plurality of cable supports is configured to provide a different path length from the end of the base portion to the curved portion of the respective cable support and back to the end of the base portion so as to provide different path lengths that are configured to provide optimized management and storage of different lengths of slack of fiber optic cables.

22. The panel of claim 20, wherein each of the cable supports comprises a D shape, and the curved portion of each of the cable supports faces a same direction.

23. The panel of claim 22, further comprising a second support portion comprising a D shape that is backward relative to the cable supports, and wherein the second support portion is disposed between the end of the base portion and one of the cable supports that is closest to the end of the base portion.

24. The panel of claim 17, further comprising a cable management portion that is disposed proximate the end of the base portion and configured to extend from the base portion in a same direction as the support portion.

25. The panel of claim 24, wherein the cable management portion comprises a clip or a bracket configured to receive a fiber optic cable.

26. The panel of claim 24, wherein the cable management portion comprises two clips.

27. The panel of claim 24, wherein the cable management portion comprises two brackets.

28. A cable management panel for optimizing management and storage of a slack portion of a fiber optic cable, comprising:
- a base portion having a planar portion extending in a longitudinal direction and a curved portion extending from an end of the planar portion;

a support portion configured to extend from the planar portion and support a cable;

a cable management portion that is disposed proximate an end of the base portion and configured to extend from the base portion in a same direction as the support portion;

wherein the cable management portion comprises a clip or a bracket configured to receive a fiber optic cable;

wherein the curved portion is configured to curve about an axis that extends perpendicular to the longitudinal direction;

wherein the curved portion is configured to prevent a fiber optic cable that is wrapped around the curved portion from being bent beyond a minimum bend radius;

wherein the support portion includes a curved portion that is configured to prevent a fiber optic cable that is wrapped around the curved portion from being bent beyond a minimum bend radius; and wherein the support portion is configured to provide a path structure for optimizing management and storage of different lengths of slack of fiber optic cables such that a selected path length from the end of the base portion to the curved portion of the support portion and back to the end of the base portion substantially matches a length of slack of a fiber optic cable such that the length of slack is maintained within the height of the base so as to eliminate the need for slack cable management structures in space about a rack to which the panel is mounted.

* * * * *